United States Patent
Oertel et al.

(10) Patent No.: US 7,480,572 B2
(45) Date of Patent: Jan. 20, 2009

(54) METHOD FOR RECOGNISING HOT TARGETS ON THE EARTH

(75) Inventors: Dieter Oertel, Schoenwald (DE); Herbert Jahn, Berlin (DE); Eckehard Lorenz, Berlin (DE); Wolfgang Baerwald, Berlin (DE); Winfried Halle, Berlin (DE); Holger Venus, Berlin (DE); Thomas Terzibaschian, Berlin (DE); Boris Zhukov, Mytischtchi (RU)

(73) Assignee: Deutsches Zentrum für Luft- und Raumfahrt a. V., Cologne (DE)

( * ) Notice: Subject to any disclaimer, the term of this patent is extended or adjusted under 35 U.S.C. 154(b) by 0 days.

(21) Appl. No.: 11/791,870

(22) PCT Filed: Nov. 11, 2005

(86) PCT No.: PCT/EP2005/012352

§ 371 (c)(1),
(2), (4) Date: Aug. 9, 2007

(87) PCT Pub. No.: WO2006/058618

PCT Pub. Date: Jun. 8, 2006

(65) Prior Publication Data

US 2008/0027649 A1    Jan. 31, 2008

(30) Foreign Application Priority Data

Nov. 30, 2004    (DE) .................. 10 2004 057 855

(51) Int. Cl.
G01V 3/00    (2006.01)
G06F 19/00    (2006.01)

(52) U.S. Cl. ............................................. 702/5
(58) Field of Classification Search ............ 702/5
See application file for complete search history.

(56) References Cited

U.S. PATENT DOCUMENTS 4,313,678 A * 2/1982 Colvocoresses ............ 356/2

(Continued)

FOREIGN PATENT DOCUMENTS

DE    198 40 873    3/2000

(Continued)

OTHER PUBLICATIONS

Search Report dated Feb. 15, 2006 for the underlying International Application No. PCT/EP2005/012352.

(Continued)

*Primary Examiner*—Michael P. Nghiem
*Assistant Examiner*—Cindy H Khuu
(74) *Attorney, Agent, or Firm*—Cohen Pontani Lieberman & Pavane LLP

(57) ABSTRACT

A method for detecting a hot target on the Earth by a satellite is disclosed. The satellite includes a sensor for acquiring data in spectral channels in the IR spectrum, and a navigation system for detecting position and orientation data of the satellite. The method includes the steps of subjecting the acquired data to a system correction by radiometric and geometric calibration files stored on the satellite; detecting a hot target on board from the system-corrected data by multi-channel thresholding; geo-referencing the hot target by the position and orientation data of the satellite and the geometric calibration files; temporarily storing the geo-referenced hot target on the satellite; and transmitting the temporarily stored hot target by a transmitting unit to a receiving unit on the Earth.

8 Claims, 2 Drawing Sheets

U.S. PATENT DOCUMENTS

| | | | | |
|---|---|---|---|---|
| 5,602,543 | A * | 2/1997 | Prata et al. | 340/968 |
| 6,281,970 | B1 * | 8/2001 | Williams et al. | 356/141.4 |
| 6,370,475 | B1 * | 4/2002 | Breed et al. | 701/301 |
| 6,484,099 | B1 * | 11/2002 | Holzer-Popp et al. | 702/2 |
| 7,202,776 | B2 * | 4/2007 | Breed | 340/435 |
| 2002/0026432 | A1 | 2/2002 | Kiji | |

FOREIGN PATENT DOCUMENTS

| | | | |
|---|---|---|---|
| EP | 0 892 286 | | 1/1999 |
| EP | 0892286 | * | 1/1999 |
| EP | 1048928 | * | 11/2000 |
| FR | 2 679 779 | | 2/1993 |

OTHER PUBLICATIONS

International Preliminary Report on Patentability dated Jun. 5, 2007 issued in corresponding application No. PCT/EP2005/012352.

Boris Zhukov et al. DLR Institute of Space Sensor Technology and Planetary Exploration BIRD Detection and Analysis of High-temperature Events: First Results, published dated Oct. 22, 2004.

* cited by examiner

METHOD FOR RECOGNISING HOT TARGETS ON THE EARTH

CROSS-REFERENCE TO RELATED APPLICATIONS

This is a U.S. national stage of International Application No. PCT/EP2005/012352, filed on 11 Nov. 2005. Priority is claimed on German Application No. 10 2004 057 855.9, filed on 30 Nov. 2004.

BACKGROUND OF THE INVENTION

1. Field of the Invention

The invention pertains to a method for detecting hot targets on the Earth, to at least one satellite suitable for this purpose, and to at least one receiving unit for this purpose.

2. Description of the Related Art

High-temperature events on the surface of the Earth often cause environmental catastrophes. Such high-temperature events include forest and savannah fires, fires of surface coal mines, volcanic activity, and others (e.g., oil well fires, pipeline fires, etc.). A quite essential precondition for the determination of the parameters of an event such as its temperature, area covered, and location is the reliable remote detection of the high-temperature event as a "hot target object" on board aircraft or space vehicles. Remote detection of hot target objects on board aircraft is possible primarily on the local or regional scale. Detection systems for high-temperature event catastrophes on board space vehicles can work on a global and regional scale. New data evaluation methods are required on board, for which the existing sensors on space vehicles and aircraft, such as those know from U.S. Pat. No. 5,602,543 A, are not sufficient.

There are various approaches to the problem of detecting hot targets (hot spots) on the surface of the Earth.

DE 198 40 873 A1, for example, describes a method and a device for the automatic detection of forest fires. The disadvantage of such stationary, earth-bound systems is that they observe the fire horizontally; that is, only the smoke column of a fire is detected. These systems are designed primarily for the early detection of fires, not for the acquisition of data concerning intensity, effective area, and effective temperature.

For daytime fire detection, EP 0 892 286 A1 describes a method for the adaptive, combined threshold processing of hot targets on the Earth's surface. By means of the method described here, it is possible to detect hot targets with a high degree of reliability. The IR (i.e., infrared) data, preferably acquired from one or more satellites, are transmitted to a ground station and evaluated there according to the method. The data, which are then also processed graphically, are made available to interested third parties over the Internet, for example. The disadvantage of the known satellite-supported systems is that they are relatively expensive because of the personnel-related and technical resources required at the ground station. There is also a not inconsiderable delay between the time at which IR data are acquired and the time at which the processed data become available to third parties.

The technical article by Zhukov et al. entitled "BIRD Detection and Analysis of High-temperature Events: First Results", Proc. SPIE, 2003, Vol. 4886, pp. 160-171, describes another multi-channel threshold method for detecting hot targets, to the disclosure of which reference is herewith explicitly made.

SUMMARY OF THE INVENTION

The invention is therefore based on the technical problem of providing a method for the detection of hot targets on the Earth by means of which simple and quickly processed hot target data can be made available and also on the task of providing satellites and receiving units suitable for this purpose.

The technical problem is solved by the method discussed below. Additional advantageous embodiments of the invention will become apparent from the following discussions.

For this purpose, the data acquired in the various spectral channels are first subjected to a system correction by means of radiometric and geometric calibration files stored on the satellite. These calibration files are generated on the ground during the laboratory calibration of the sensors and are preferably updated continuously during the flight. Then the hot targets in the system-corrected data are determined on board by a multi-channel threshold method. For example, a multi-channel threshold method such as that described in EP 0 892 286 A1 or in the technical article "BIRD Detection and Analysis of High-temperature Events: First Results" is used, where reference is made to the disclosure of those publications. The disclosures of these two publications are incorporated herein by reference. The potential hot targets determined in this way are georeferenced by means of the position and orientation data of the satellite and the geometric calibration files and then stored temporarily. These "hot-spot data" can then be transmitted to the ground by means of the transmitting unit. This data file can be received directly by a preferably mobile receiving unit and decoded. The decoded data can be digitally processed into graphic form, for which purpose they are superimposed onto an existing digital map of the environment of the receiving station. The basic idea of the invention therefore consists in having certain essential substeps of the detection process conducted on board the satellite, so that the only data which the satellite is required to transmit are the data on these—still only potential—georeferenced hot, spots. For these small amounts of data, a frequency-modulated high-frequency broadcast transmission at a low data rate to Earth can be used. Because the transmitted data have already been georeferenced, they can be received and evaluated directly (without the need for the intermediate step of evaluation by a stationary ground station). For this purpose, a mobile, portable GPS receiver with an HF receiver for the HF broadcast transmission can serve as the mobile receiving unit. The data packets are decoded here in a decoder, entered via a suitable interface on a digital map in the GPS receiver, and displayed in some suitable manner.

The IR data are preferably detected at least in the MIR (mid-infrared), TIR (thermal infrared), and VNIR (visible near-infrared) spectral bands. The MIR channel is in the 3-5 μm spectral range, and preferably in the range of 3.5-4.2 μm. The TIR channel is in the range of 8-13 μm, and preferably in the range of 8.5-9.3 μm. The VNIR channel is in the range of 0.4-1.0 μm, and preferably in the range of 0.5-0.7 μm.

In another preferred embodiment, a time stamp is assigned on the satellite to the acquired IR data; this time stamp is also transmitted during the broadcast transmission.

In another preferred embodiment, a method with the following steps, as also described in EP 0 892 286 A1, is used for the detection of the hot spots:

Detection of the hot spots by adaptive thresholding in the mid-infrared (MIR), where the fire-free pixels with specific MIR radiance below the threshold value are rejected according to a moving window algorithm for the detection of hot spots in the MIR channel image data by calculation of the median $g^{MIR}_{med}$ and the deviation:

$$d^{MIR} = \frac{1}{N}\sum_{i=1}^{N} |g_i^{MIR} - g_{med}^{MIR}| \quad (M1)$$

for each moving window box of the MIR images, where N is the number of pixels in the box, $g^{MIR}_i$ is their radiance signals; and a pixel is identified as a hot spot when:

$$g_i^{MIR} > g_{med}^{MIR} + \Delta g^{MIR}, \quad (M2)$$

where the threshold value $\Delta g^{MIR}$ above the median $g^{MIR}_{med}$ is adapted to the deviation $d^{MIR}$ and is proportional to it:

$$\Delta g^{MIR} = \alpha^{MIR} \cdot d^{MIR}, \quad (M3)$$

with the parameter $\alpha^{MIR}$, selected under the condition that a combined MIR/VNIR-radiance ratio threshold value is used later for false-alarm rejection (Step 1).

Three successive processing procedures, which are executed for each bright spot as obtained in the preceding step S1 of the co-registered multi-spectral scene, where both fixed and adaptive thresholding operations with their radiometric data in the channel of the thermal infrared (TIR) in combination with a thresholding operation using a ratio of the radiometric data in the MIR channel to the radiometric data in a channel of the visible/near-infrared (VNIR) (Step S2) are provided, where these combined procedures consist of the following substeps:

Substep SS2.1: Fixed thresholding in the TIR, where, in order to exclude cloud pixels, the radiation temperature calculated from the system-corrected sensor data for all of the bright spots must exceed the radiance corresponding to a threshold temperature (e.g., 250 K).

Substep SS2.2: An adaptive MIR/VNIR ratio threshold $thres_{MIR/VNIR}$ is applied to all remaining bright spots, which leads to the result that all of the bright spots with a MIR/VNIR channel radiance ratio below $thres_{MIR/VNIR}$ are filtered out as false alarms.

Substep SS2.3: In a moving window procedure, all remaining bright spots are subjected by adaptive TIR thresholding to an adaptive TIR thresholding operation, where fire-free false-alarm pixels with a TIR radiance below a threshold (determined by calculation of the median $g^{TIR}_{med}$ and the deviation:

$$d^{TIR} = \frac{1}{N}\sum_{i=1}^{N} |g_i^{TIR} - g_{med}^{TIR}| \quad (T1)$$

for each moving window box of the TIR image) are rejected, where N is the number of pixels in the box; $g^{TIR}_i$ is their radiance signals; and a pixel is identified as a hot spot when $$g_i^{TIR} > g_{med}^{TIR} + \Delta g^{TIR}, \quad (T2)$$

where the threshold $\Delta g^{TIR}$ above the median is selected in such a way that additional rejection of small hot target objects is avoided.

In an alternative embodiment, the multi-channel threshold method described in Chapter 2, "Hotspot Detection and Analysis Algorithm", in "BIRD Detection and Analysis of High-temperature Events: First Results", is used. This method is especially preferred because of the modest computing effort involved.

In another preferred embodiment, the intensity of the hot targets is obtained by an estimate of the radiant power from the signal of the MIR channel.

In another preferred embodiment, the effective temperature and the effective area of the hot targets are determined, and the radiant power is then calculated from these values. This is done, for example, in the manner described in EP 0 892 286 A1 under (OS3). The effective temperature and the effective area of the hot targets are preferably calculated only when the previously estimated intensity is above a predetermined limit. Alternatively, here, too, the approaches described in "BIRD Detection and Analysis of High-temperature Events: First Results", can be used.

BRIEF DESCRIPTION OF THE DRAWINGS

The invention is explained in greater detail below on the basis of a preferred exemplary embodiment.

DETAILED DESCRIPTION OF THE PREFERRED EMBODIMENTS

Figure 1:
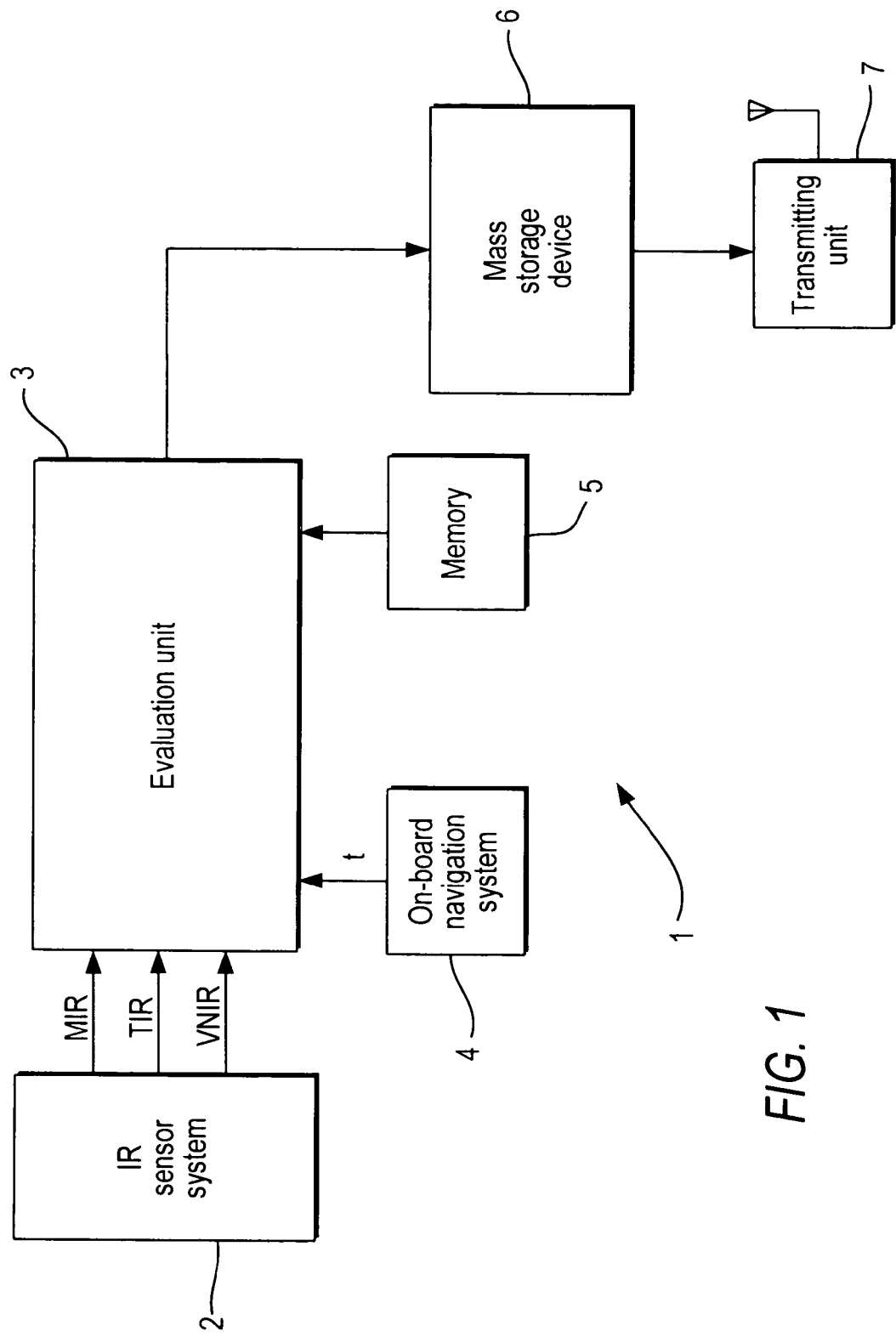
FIG. 1 shows a schematic block diagram of a device on board a satellite for detecting hot targets on the surface of the Earth.

The device 1 for detecting hot targets on the Earth is a component of several or of one satellite, which is in a polar Earth orbit, for example, in synchrony with the sun at an altitude of approximately 700 km. Device 1 comprises an IR sensor system 2, which is formed by, for example, an IR camera; an evaluation unit 3; an on-board navigation system 4; a time recording unit (not shown); a memory 5 with radiometric and geometric calibration files; a mass storage device 6; and a transmitting unit 7.

The IR sensor system 2 detects IR data in the MIR, TIR, and VNIR spectral regions. The detected data are sent to the evaluation unit 3, where a system correction is carried out by means of the calibration files accessed from the memory 5. A time datum t and position and orientation data from the on-board navigation device 4 are also sent to the evaluation unit 3. In the evaluation unit 3, detection is then carried out in real time by a multi-channel threshold method, which includes false-alarm filtering. In addition, the intensity of the hot targets is evaluated quantitatively on the basis of an estimate of the radiant power in the signal of the MIR channel. If the intensity thus determined exceeds a predetermined limit, the effective temperature and the effective area of the hot target are also determined, and the radiant power of the hot target is calculated from its effective temperature and effective area. Then the hot target data thus acquired are also georeferenced, for which purpose the data of the on-board navigation system 4 and the geometric calibration files are used. The georeferenced data are then copied to the mass storage device 6 and read out successively by the transmitting unit 7. The transmitting unit 7 performs a frequency modulation and transmits the data to the Earth as an HF broadcast transmission at a low data rate.

The on-board navigation system 4 consists preferably of a satellite-capable GPS receiver, an inertial measurement unit (IMU), and at least one star sensor. The star sensor, which is preferably designed as a camera, detects constellations, which are compared with stored star charts in the star sensor. With the help of the quaternions generated in the star sensor, the orientation of the satellite and of the multi-channel IR sensor system is updated in the on-board navigation system 4.

This makes it possible in particular for the IMU to be calibrated again when the system is turned back on after a system power-down. The on-board navigation system 4, furthermore, comprises a computer for collecting the individual sets of navigation data and a telemetry/command-receiving and transmitting unit, by means of which the satellite can communicate with a ground station and via which the calibration files, for example, also stored in the memory 5, can be adapted. The primary task of the on-board navigation 4 system, however, is to keep track of the position and orientation data.

Figure 2:
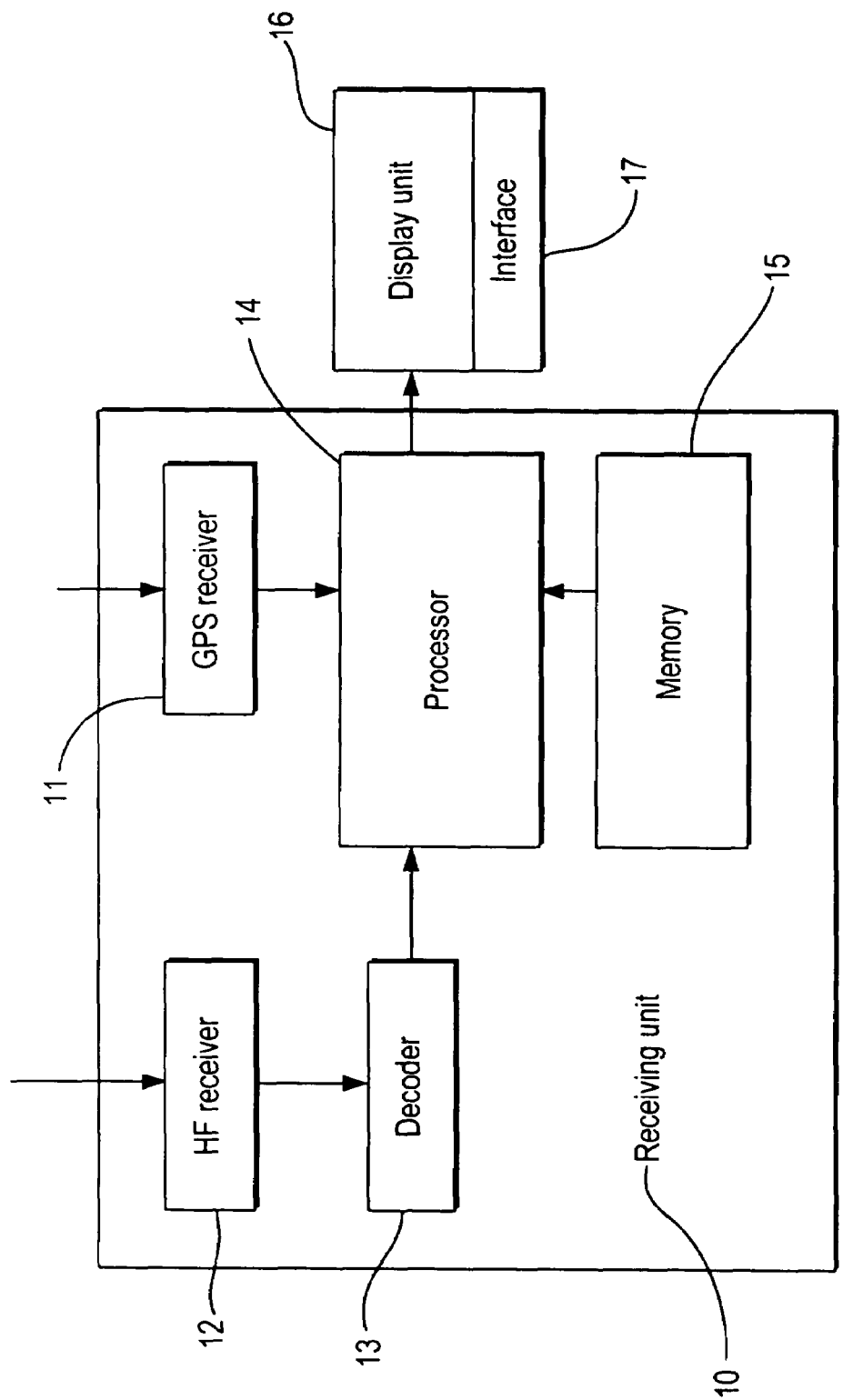
FIG. 2 shows a schematic block diagram of the mobile, portable receiving unit.

FIG. 2 shows a schematic block diagram of a mobile, portable receiving unit 10 for the HF broadcast messages coming from the satellite. The receiving unit 10 comprises a GPS receiver 11, an HF receiver 12 for the HF broadcast messages coming from the satellite, a decoder 13, a processor 14, a memory 15 for digital maps, and a display unit 16. The display unit 16 may include an interface 17 for a digital map software of the GPS receiver 11. As is well known, the GPS receiver 11 detects signals from GPS satellites and uses these signals to determine the location of the receiving unit. This location and the decoded HF broadcast messages are sent to the processor 14. A digital map of the environment is filed in the memory 15, where the data can be made available on a data storage medium or made accessible on-line. The hot targets are visualized on the display unit 16, which is either integrated into the receiving unit 10 or can be connected to it as an accessory. The georeferenced hot targets are then shown on the digital map of the environment. Preferably the following additional information is also displayed:

geographic longitude and latitude (with tolerances, depending on the error of the data in the on-board navigation system, on the height above sea level of the receiving location at the moment in question, etc.);

the time of registration;

the intensity and, if the intensity is high, the effective area and effective temperature (with tolerances, depending on the size and intensity of the hot target); and the longitude and latitude of the location of the receiver, that is, of the receiving unit, at the moment in question.

What is claimed is:

1. A method for detecting a hot target on the Earth by means of a satellite, the satellite comprising a sensor for acquiring data in various spectral channels in the IR (infrared) spectrum, an on-board navigation system for detecting position and orientation data of the satellite, and a transmitting unit for transmitting data to a receiving unit on the Earth, the method comprising the steps of:

acquiring, by the sensor of the satellite, data related to a surface of the Earth in the various spectral channels;

subjecting the acquired data to a system correction using radiometric and geometric calibration files stored on the satellite;

detecting a hot target on board the satellite from the system-corrected data using multi-channel thresholding;

geo-referencing the detected hot target on the basis of the position and orientation data of the satellite and the geometric calibration files;

temporarily storing the geo-referenced detected hot target on the satellite;

transmitting the temporarily stored hot target by the transmitting unit; and receiving, demodulating, decoding and graphically displaying the transmitted hot target in the receiving unit, the receiving unit integrating geographic longitude and latitude of an instantaneous location of the receiving unit into the graphic display of the transmitted hot target.

2. The method of claim 1, wherein said step of acquiring comprises acquiring data in MIR (mid-infrared), TIR (thermal infrared), and VNIR (visible near-infrared) spectral channels.

3. The method of claim 2, wherein
the MIR spectral channel is in a spectral range of 3-5 μm;
the TIR spectral channel is in a spectral range of 8-13 μm; and
the VNIR spectral channel is in a spectral range of 0.4-1.0 μm.

4. The method of claim 3, wherein
the MIR spectral channel is in a spectral range of 3.5-4.2 μm;
the TIR spectral channel is in a spectral range of 8.5-9.3 μm; and
the VNIR spectral channel is in a spectral range of 0.5-0.7 μm.

5. The method of claim 2, wherein said step of detecting a hot target comprises:

detecting hot spots by an adaptive MIR thresholding, where fire-free pixels with a MIR radiance below a threshold value are rejected according to a moving window algorithm for detection of hot spots in the TIR channel image data by calculation of a median $g^{MIR}_{med}$ and a deviation:

$$d^{MIR} = \frac{1}{N}\sum_{i=1}^{N} |g_i^{MIR} - g_{med}^{MIR}| \tag{M1}$$

for each moving window box of MIR images, where N is the number of pixels in the box, $g^{MIR}_i$ are their radiance signals; and a pixel is identified as a hot spot when:

$$g_t^{MIR} > g_{med}^{MIR} + \Delta g^{MIR}, \tag{M2}$$

where the threshold value $\Delta g^{MIR}$ above the median $g^{MIR}_{med}$ is adapted to and proportional to the deviation $d^{MIR}$:

$$\Delta g^{MIR} = \alpha^{MIR} \cdot d^{MIR}, \tag{M3}$$

with the parameter $\alpha^{MIR}$, selected under the condition that a combined MIR/VNIR-radiance ratio threshold value is used later for false-alarm rejection; and performing three successive processing procedures for each hot target as obtained in the preceding step of detecting, where both fixed and adaptive thresholding operations with their radiometric data in the TIR channel in combination with a thresholding operation using a ratio of radiometric data in the MIR channel to radiometric data in the VNIR channel are provided, wherein these processing procedures comprise the following sub-steps of:

fixed thresholding in the TIR, where, in order to exclude cloud pixels, the radiation temperature calculated from the system-corrected sensor data for all of the hot targets must exceed a radiance corresponding to a threshold temperature;

applying an adaptive MIR/VNIR ratio threshold $thres_{MIR/VNIR}$ to all remaining hot targets, which leads to the result that all of the hot targets with a MIR/VNIR channel radiance ratio below $thres_{MIR/VNIR}$ are filtered out as false alarms; and in a moving window procedure, subjecting all remaining hot targets by adaptive TIR thresholding to an adaptive TIR thresholding operation, where fire-free false-alarm pixels with a TIR radiance below a threshold (determined by calculation of a median $g^{TIR}_{med}$ and a deviation:

$$d^{TIR} = \frac{1}{N}\sum_{i=1}^{N} |g_i^{TIR} - g_{med}^{TIR}| \tag{T1}$$

for each moving window box of the TIR image) are rejected, where N is the number of pixels in the box; $g^{TIR}_i$ are their radiance signals; and a pixel is identified as a hot spot when $$g_i^{TIR} > g_{med}^{TIR} + \Delta g^{TIR}, \tag{T2}$$

where the threshold $\Delta g^{TIR}$ above the median is selected so that additional rejection of small hot targets is avoided.

6. The method of claim 2, further comprising the step of obtaining an intensity of the hot target by an estimate of a radiant power of the hot target from a signal of the MIR spectral channel.

7. The method of claim 1, further comprising the step of assigning a detection time stamp to the detected hot target.

8. The method of claim 1, further comprising the step of determining an effective temperature and an effective area of the hot target, and calculating a radiant power of the hot target from the determined effective temperature and the effective area of the hot target.

* * * * *